United States Patent
Peterson et al.

(10) Patent No.: US 9,571,504 B2
(45) Date of Patent: Feb. 14, 2017

(54) AUTHORIZING CONTENT VIEWING BASED ON CONTENT RATINGS

(71) Applicant: LENOVO (Singapore) PTE, LTD., New Tech Park (SG)

(72) Inventors: Nathan J. Peterson, Durham, NC (US); John Carl Mese, Cary, NC (US); Russell Speight VanBlon, Raleigh, NC (US); Rod D. Waltermann, Rougemont, NC (US)

(73) Assignee: Lenovo (Singapore) PTE. LTD., New Tech Park (SG)

( * ) Notice: Subject to any disclaimer, the term of this patent is extended or adjusted under 35 U.S.C. 154(b) by 0 days.

(21) Appl. No.: 14/307,302

(22) Filed: Jun. 17, 2014

(65) Prior Publication Data
US 2015/0365422 A1    Dec. 17, 2015

(51) Int. Cl.
*H04L 29/06* (2006.01)
*G06F 17/30* (2006.01)
*G06F 21/62* (2013.01)

(52) U.S. Cl.
CPC ....... *H04L 63/105* (2013.01); *G06F 17/30867* (2013.01); *G06F 21/6218* (2013.01); *G06F 2221/2113* (2013.01); *G06F 2221/2149* (2013.01)

(58) Field of Classification Search
CPC ..... H04L 63/107; H04L 63/102; H04L 63/105
See application file for complete search history.

(56) References Cited

U.S. PATENT DOCUMENTS

| | | | |
|---|---|---|---|
| 2005/0185216 A1* | 8/2005 | Mitsuhashi | H04N 1/00496 358/1.15 |
| 2006/0053440 A1* | 3/2006 | Kelly et al. | 725/28 |
| 2006/0168137 A1* | 7/2006 | Lim | H04L 63/0428 709/219 |
| 2011/0035768 A1* | 2/2011 | Ling et al. | 725/28 |
| 2011/0283311 A1* | 11/2011 | Luong | 725/28 |
| 2013/0212618 A1* | 8/2013 | Schultz | 725/30 |
| 2014/0181910 A1* | 6/2014 | Fingal et al. | 726/4 |
| 2014/0226000 A1* | 8/2014 | Vilcovsky | G06F 3/017 348/77 |

* cited by examiner

*Primary Examiner* — Amir Mehrmanesh
(74) *Attorney, Agent, or Firm* — Kunzler Law Group (57) ABSTRACT

Apparatuses, methods, and computer program products are included that receive a content rating for content presented to an individual, determine a content authorization parameter for the individual, and trigger a precautionary action associated with the content in response to determining that the content authorization parameter for the individual is not compliant with the content rating for the content.

18 Claims, 6 Drawing Sheets

AUTHORIZING CONTENT VIEWING BASED ON CONTENT RATINGS

FIELD

The subject matter disclosed herein relates to media controls and more particularly relates to authorization content viewing based on content ratings.

BACKGROUND

Description of the Related Art

Content restrictions, a.k.a. parental controls, may be used to prevent certain individuals, or groups of individuals, from viewing specific content, using specific features, etc. In particular, parental controls allow an authorized individual to filter, manage, or monitor particular content that may be viewed by unauthorized individuals, such as children, guests, etc. Typically, parental controls are used to protect unauthorized individuals from viewing or consuming content that may be inappropriate for their age, maturity, etc.

BRIEF SUMMARY

A method for authorization content viewing based on content ratings is disclosed. An apparatus and computer program product also perform the functions of the method. In one embodiment, a method includes receiving, by a processor, a content rating for content presented to an individual. In certain embodiments, the method includes determining a content authorization parameter for the individual. In some embodiments, the method includes triggering a precautionary action associated with the content in response to determining that the content authorization parameter for the individual is not compliant with the content rating for the content.

In one embodiment, the content authorization parameter for the individual is determined based on a size of the individual. In a further embodiment, the content authorization parameter for the individual is determined in response to recognizing the face of the individual. In yet another embodiment the content authorization parameter for the individual is determined in response to receiving the content authorization parameter from a device associated with the individual. In some embodiments, the content authorization parameter may be located on the device. In certain embodiments, the device associated with the individual is selected from the group consisting of a wearable device, a smart phone, and a tablet computer.

In some embodiments, the precautionary action comprises suspending playback of the presented content. In certain embodiments, the precautionary action comprises changing the presented content to different content that has a rating that is compliant with to the content authorization parameter of the individual. In a further embodiment, the precautionary action comprises muting the presented content. In yet another embodiment, the precautionary action comprises presenting a warning that the individual is not authorized for the content.

In one embodiment, the individual is one of a plurality of individuals comprising a group and the precautionary action is triggered in response to the content authorization parameter for any one individual of the group not being compliant with the content rating for the content. In certain embodiments, the method further includes overriding the precautionary action in response to receiving an override confirmation from an authorized individual. In some embodiments, the override confirmation comprises a gesture input.

An apparatus, in one embodiment, includes a processor and a sensor that receives input related to an individual. In certain embodiments, the apparatus includes a memory that stores code executable by the processor. In one embodiment, the code receives a content rating for content presented to an individual. In some embodiments, the code determines a content authorization parameter for the individual. In a further embodiment, the code triggers a precautionary action associated with the content in response to determining that the content authorization parameter for the individual is not compliant with the content rating for the content.

In one embodiment, the content authorization parameter for the individual is determined in response to determining a size of the individual using the sensor. In another embodiment, the content authorization parameter for the individual is determined in response to recognizing the face of the individual using the sensor. In one embodiment, the content authorization parameter for the individual is determined in response to receiving the content authorization parameter from a device associated with the individual, the content authorization parameter being located on the device.

In one embodiment, the precautionary action comprises suspending playback of the presented content. In a further embodiment, the precautionary action comprises changing the presented content to different content that has a rating compliant with the content authorization parameter of the individual. In some embodiments, the apparatus includes code that overrides the precautionary action in response to receiving an override confirmation from an individual. In one embodiment, the override confirmation comprises a gesture input. In another embodiment, the individual is one of a plurality of individuals comprising a group. In certain embodiments, the precautionary action is triggered in response to the content authorization parameter for any one individual of the group not being compliant with the content rating for the content.

In one embodiment, a computer program product is provided that includes a computer readable storage medium that stores code executable to perform operations. In one embodiment, the operations include receiving a content rating for content presented to an individual. In certain embodiments, the operations include determining a content authorization parameter for the individual. In a further embodiment, the operations include triggering a precautionary action associated with the content in response to determining that the content authorization parameter for the individual is not compliant with the content rating for the content.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages, including an object oriented programming language such as Java, Smalltalk, C++ or the like and conventional procedural programming languages, such as the "C" programming language or similar programming languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Figure 1:
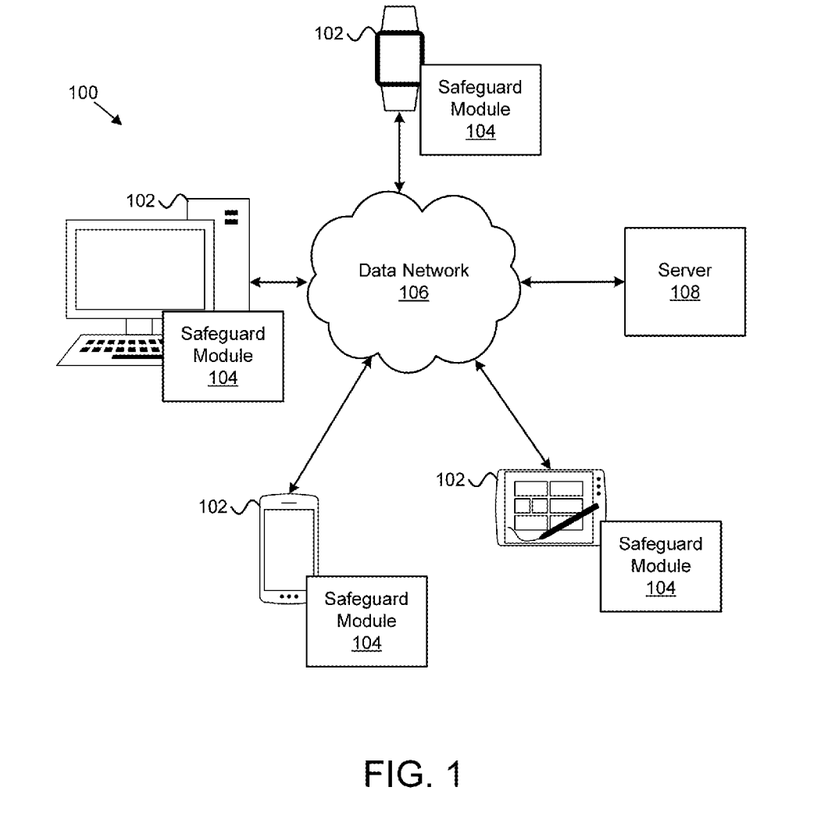
FIG. 1 is a schematic block diagram illustrating one embodiment of a system for authorizing content viewing based on content ratings.

FIG. 1 depicts one embodiment of a system 100 for authorizing content viewing based on content ratings. In one embodiment, the system 100 includes information handling devices 102, safeguard modules 104, data networks 106, and servers 108. Even though a specific number of information handling devices 102, safeguard modules 104, data networks 106, and servers 108 are depicted in FIG. 1, one of skill in the art will recognize that any number of information handling devices 102, safeguard modules 104, data networks 106, and servers 108 may be included in the system 100.

In one embodiment, the information handling devices 102 comprise computing devices, such as desktop computers, laptop computers, personal digital assistants (PDAs), tablet computers, smart phones, smart televisions (e.g., televisions connected to the Internet), set-top boxes (e.g., Roku®, Apple TV®, Amazon Fire®, or the like), cable boxes, satellite boxes, game consoles (e.g., Sony Playstation®, Microsoft Xbox®, Nintendo Wii®, or the like), or the like. In some embodiments, the information handling devices 102 comprise wearable devices, such as smart watches, fitness bands, optical head-mounted displays, or the like. In one embodiment, the information handling devices 102 include one or more cameras and sensors, such as proximity sensors, presence sensors, facial recognition sensors, and/or the like.

The information handling devices 102, and/or the server 108, may include an embodiment of the safeguard module 104. In certain embodiments, the safeguard module 104 is configured to receive a content rating for content presented to an individual, determine a content authorization parameter for the individual, and trigger a precautionary action if the content authorization parameter for the individual is not compliant with the content rating. In this manner, the safeguard module 104 may determine if content should be presented to certain individuals, or groups of individuals, based on various factors described below. The safeguard module 104, in the event that the individual is not authorized to view the presented content, may take a precautionary action related to the content, such as pausing or stopping playback of the content, changing the presented content to different content that the individual is authorized to view, muting the content, displaying a warning, or the like. In certain embodiments, the safeguard module 104 includes various modules that perform one or more of the operations of the safeguard module 104, which are described in more detail below with reference to FIGS. 2 and 3.

The data network 106, in one embodiment, comprises a digital communication network that transmits digital communications related to an automated messaging response system 100. The data network 106 may include a wireless network, such as a wireless cellular network, a local wireless network, such as a Wi-Fi network, a Bluetooth® network, a near-field communication (NFC) network, an ad hoc network, and/or the like. The data network 106 may include a wide area network (WAN), a storage area network (SAN), a local area network (LAN), an optical fiber network, the internet, or other digital communication network. The data network 106 may include two or more networks. The data network 106 may include one or more servers, routers, switches, and/or other networking equipment. The data network 106 may also include computer readable storage media, such as a hard disk drive, an optical drive, nonvolatile memory, random access memory (RAM), or the like.

In one embodiment, the servers 108 include computing devices, such as desktop computers, laptop computers, mainframe computers, cloud servers, virtual servers, and/or the like. In some embodiments, the servers 108 are configured as application servers, communication servers, database servers, file servers, game servers, home servers, media servers, web servers, and/or the like. In certain embodiments, the servers 108 store a plurality of content, such as multimedia content, that may be accessed by an information handling device 102 through the network 106. The servers 108 may include at least a portion of the safeguard module 104 and perform one or more operations of the safeguard module 104.

Figure 2:
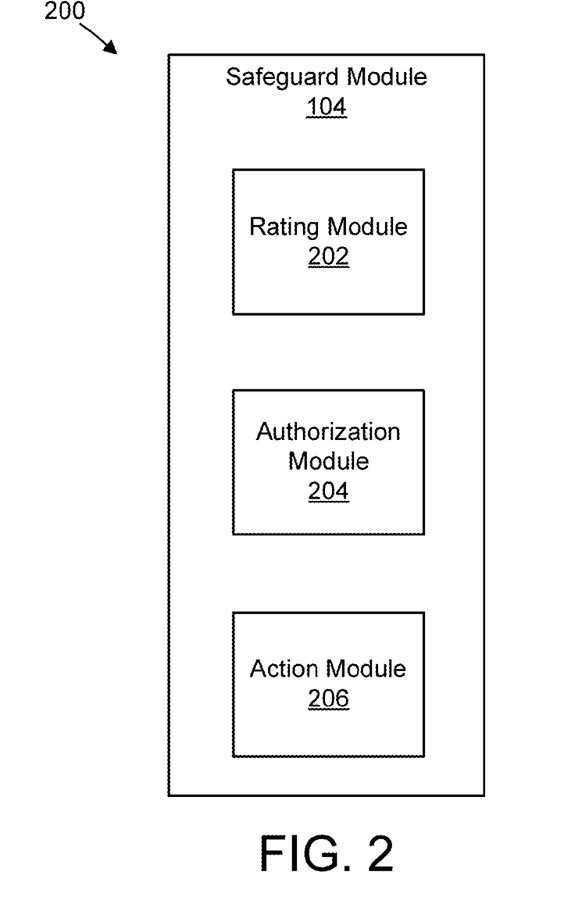
FIG. 2 is a schematic block diagram illustrating one embodiment of a module for authorizing content viewing based on content ratings.

FIG. 2 depicts one embodiment of a module 200 for authorizing content viewing based on content ratings. In one embodiment, the module 200 includes an embodiment of a safeguard module 104. The safeguard module 104, in certain embodiments, includes a rating module 202, an authorization module 204, and an action module 206, which are described in more detail below.

In one embodiment, the rating module 202 is configured to receive a content rating for content presented to an individual. In certain embodiments, the content presented to the individual comprises multimedia content, such as movies, television programs, music, radio programs, and/or the like. In some embodiments, the content comprises a multimedia list or guide, such as a TV program guide, a movie guide, or the like. In one embodiment, the content is downloaded from a server 108, streamed over the data network 106 to an information handling device 102, and/or the like. The content may be presented on an information handling device 102 that is configured to present the content, such as a television, a smart television, a computer, a tablet, a smart phone, a set-top box, a game console, a digital video recorder (DVR), or the like.

In one embodiment, the content is associated with a rating. As used herein, a content rating indicates the suitability of the content for an audience. A content rating, in certain embodiments, may be based on a rating system for the particular content being presented. For example, a movie rating may be based on the film-rating system of the Motion Picture Association of America (MPAA), which is only one of various motion picture rating systems that help individuals determine the appropriateness of a movie, and may include the movie ratings G, PG, PG-13, R, and NC-17. Similarly, for television programming, the rating system may be based on the TV Parental Guidelines system, which may include ratings such as TV-Y, TV-Y7, TV-G, TV-PG, TV-14, and TV-MA. In one embodiment, the content rating also includes content descriptors, such as L for strong or coarse language, S for sexual content, V for violence, and/or the like. In some embodiments, the ratings module 202 receives content ratings for content provided by online content providers, such as Netflix®, Hulu®, and/or the like. Online content providers, in certain embodiments, use rating systems to rate the content provided on their sites, such as the TV Parental Guidelines ratings system. Similarly, online content vendors, such as Google Play®, the iTunes Store®, and/or the like, may use a ratings system to rate content provided by their services.

The authorization module 204, in one embodiment, is configured to determine a content authorization parameter for the individual. As used herein, the content authorization parameter for the individual comprises a content rating for content that the individual is authorized to view. In one embodiment, the content authorization parameter comprises a level, or multiple levels, of a plurality of content authorization levels that may correspond to a particular rating system (see above). For example, the individual may be authorized to view movies that have a PG-13 rating or lower (e.g., PG and G rated movies), but not R-rated movies. In some embodiments, the content authorization parameter comprises a single parameter and not multiple levels, such as an individual, for example, that may be authorized to only view G rated movies. In certain embodiments, the authorization module 204 determines the content authorization parameter for an individual in response to the individual being with a predetermined proximity of the authorization module 204, one or more sensors, a device presenting the content, and/or the like. In some embodiments, the authorization module 204 determines the content authorization parameter for each individual of a group of individuals.

In one embodiment, the authorization module 204 determines a content authorization parameter of the individual based on the size of the individual. The size of the individual, in certain embodiments, is determined based on the individual's height and/or width. In some embodiments, the size of the individual is determined based on the size of various physical features of the individual, such as head size, hand size, foot size, arm length, or the like. In certain embodiments, the authorization module 204 uses one or more sensors to determine the size of the individual, such as presence sensors, proximity sensors, cameras, and/or the like. For example, a child may be authorized to watch PG-rated movies and the child's parent may be authorized for R-rated movies. The authorization module 204, in order to determine the child's content authorization parameter, which in this example is PG, may identify the child based on the height of the child.

In some embodiments, the authorization module 204 maintains a list of individuals and their characteristics, including their content authorization parameters, in order to determine an individual's content authorization parameter. For example, the authorization module 204 may receive data describing an individual's height and reference a list of individual's using the individual's height in order to determine the individual's content authorization parameter. In certain embodiments, the data describing the individual's characteristics, e.g., the individual's height, is the key into a database, index, table, list or the like. In other words, the characteristic data is used to find an individual in the list, and, accordingly, the individual's content authorization parameter.

In some embodiments, the authorization module 204 determines an individual's content authorization parameter based on facial recognition data. For example, the authorization module 204 may use a facial recognition sensor, e.g., a camera, to detect an individual's facial characteristics. Based on the detected characteristics, the authorization module 204 may reference a database of individuals, using the facial recognition data as a key into the database, to find the individual and the accompanying content authorization parameter for the individual. Similarly, the authorization module 204, in another embodiment, recognizes the voice of an individual, using a voice recognition sensor (e.g., a microphone), to determine the content authorization parameter of the individual.

In a further embodiment, the authorization module 204 determines an individual's content authorization parameter by receiving the content authorization parameter from a device associated with the individual. In certain embodiments, the authorization module 204 is in communication with one or more devices through the network 106. In such an embodiment, the authorization module 204 may receive a content authorization parameter for an individual associated with the device. For example, the authorization module 204 may receive a content authorization parameter for an individual from a smart watch that the individual is wearing. In another example, the authorization module 204 may be in communication with a tablet computer associated with an individual such that when the individual carries the tablet computer within a predetermined proximity of the presented content (e.g., within a predetermined proximity of the safeguard module 104, one or more sensors, or the like), the authorization module 204 receives the content authorization parameter for the individual from the tablet computer.

In some embodiments, the authorization module 204 uses a combination of means for determining the content authorization parameter of the individual. For example, the authorization module 204 may receive a content authorization parameter from a smart watch being worn by an individual. In order to verify that the individual wearing the smart watch is the real individual associated with the smart watch, the authorization module 204 may also determine the size of the individual, recognize the face of the individual, and/or the like. Alternatively, or in addition, the authorization module 204 may determine the identity of the individual wearing the smart watch by receiving verification from the smart watch, i.e., if the individual signs in to the device using one or more credentials, then the smart watch may notify the authorization module 204 that the individual has verified their identity.

In certain embodiments, if the authorization module 204 cannot determine the individual's content authorization parameter, the authorization module 204 may notify the action module 206 (described below) to take a precautionary action. In some embodiments, the authorization module 204 may prompt the individual, or a different individual, for the individual's content authorization parameter. For example, if the authorization module 204 is unable to determine the content authorization parameter for a child, the authorization module 204 may request the content authorization parameter from one of the child's parents or guardians. In certain embodiments, the authorization module 204 stores the received content authorization parameter for the child and the child's characteristics, such as the child's size, facial features, device identifier, or the like, for future reference.

In one embodiment, the action module 206 is configured to trigger a precautionary action associated with the presented content. In one embodiment, the action module 206 triggers a precautionary action in response to determining that the content authorization parameter for the individual is not compliant with the content rating for the content. For example, if the content authorization parameter for an individual is PG, but the content rating for the presented content is R, then the action module 206 may trigger a precautionary action. In certain embodiments that involve a group of individuals, the lowest content authorization parameter of the individuals controls the action taken by the action module 206, if any. For example, if the authorization module 204 determines that the lowest content authorization parameter for a family watching TV is PG, then the action module 206 may not present content having a content rating higher than PG, unless expressly authorized by an individual with authorization, e.g., a parent.

In one embodiment, the precautionary action triggered by the action module 206 comprises suspending playback of the presented content. In certain embodiments, the action module 206 suspends playback of the content by pausing or stopping playback of the content. In this manner, if an individual is in a room where the content is being played and the authorization module 204 determines that the individual's content authorization parameter is not compliant with the content rating for the content being played, the action module 206 pauses or stops the content such that the individual is not allowed to continue viewing the content. For example, the action module 206 may pause an R-rated movie that an adult couple may be watching in response to a child walking into the room who is not authorized to view R-rated movies.

In one embodiment, the precautionary action triggered by the action module 206 includes displaying a blank screen, a screen saver, or the like, instead of the presented content. In certain embodiments, after the action module 204 pauses or suspends the presented content, the action module 204 may also blank the screen. In this manner, an individual who does not have the requisite content authorization parameter to view the presented content will not be exposed to the content.

In a further embodiment, the precautionary action triggered by the action module 206 comprises changing the presented content to content that has a content rating in accordance with the individual's content authorization parameter. For example, the action module 206, in response to determining a child's content authorization parameter does not meet the content rating for a television program that is being presented, may change the television program to a different television program that has a content rating compliant with the child's content rating. In one embodiment, the precautionary action comprises muting the sound of the presented content. For example, the action module 206 may mute a radio program that has a content rating that is greater than the content authorization parameter of an individual so that the individual is not allowed to hear the content.

In one embodiment, the action module 206 triggers a precautionary action that notifies, alerts, warns, or the like, an authorized individual that the presented content has a content rating that is higher than an individual's content authorization parameter. For example, the action module 206 may pause the presented content and display a message that a child is in the room and is not authorized to view the presented content. In a further embodiment, the precautionary action includes locking the device that is presenting the content such that only an authorized individual may access the device. For example, the action module 206 may suspend playback of the content and lock the device such that a child, or another unauthorized individual, may not access the device to continue playback of the content.

Figure 3:
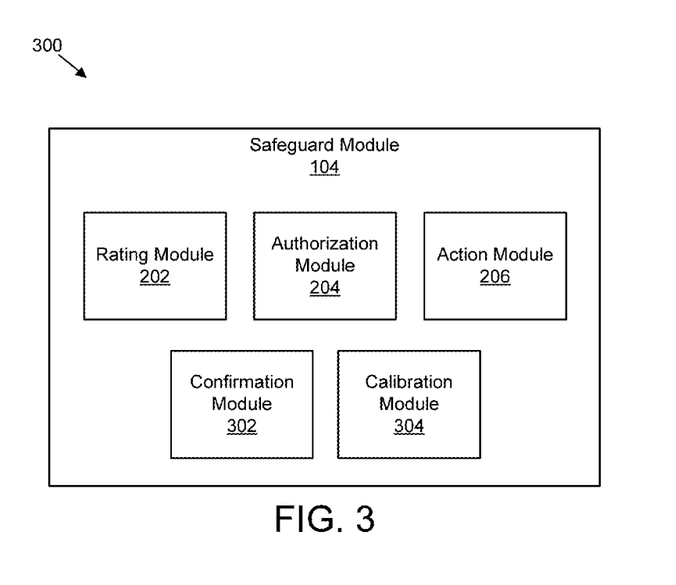
FIG. 3 is a schematic block diagram illustrating one embodiment of another module for authorizing content viewing based on content ratings.

FIG. 3 depicts one embodiment of another module 300 for authorizing content viewing based on content ratings. In one embodiment, the module 300 includes an embodiment of a safeguard module 104. The safeguard module 104, in some embodiments, includes a rating module 202, an authorization module 204, and an action module 206, which may be substantially similar to the rating module 202, the authorization module 204, and the action module 206 described above with reference to FIG. 2. In a further embodiment, the safeguard module 104 includes a confirmation module 302 and a calibration module 304, which are described in more detail below.

In one embodiment, the confirmation module 302 overrides the precautionary action in response to receiving an override confirmation from an individual. In certain embodiments, the confirmation module 302, in response to the action module 206 triggering a precautionary action, prompts for confirmation from an authorized individual to continue the precautionary action or to override the precautionary action. For example, if the action module 206 pauses playback of an R-rated movie in response to a child entering the room (after the action module 206 determines the child has a content authorization parameter that is not compliant with the R-rated movie), the confirmation module 302 may request confirmation from an authorized individual viewing the R-rated movie to continue pausing the movie or to continue playback of the movie.

In some embodiments, the confirmation module 302 stores the authorized individual's confirmation decision for future reference. In some embodiments, the confirmation module 302 associates the confirmation decision with the unauthorized individual such that the next time the action module 206 determines that the individual's content authorization parameter is not compliant with the content rating for the presented content, the action module 206 will not trigger the precautionary action. For example, the confirmation module 302 may store a parent's confirmation decision to authorize her ten-year-old child to watch a PG-13 movie such that the next time the child views a PG-13 movie, the action module 206 does not trigger the precautionary action.

In a further embodiment, the confirmation module 302 associates the confirmation decision with the presented content. For example, the confirmation module 302 may store a parent's confirmation decision to authorize her ten-year-old child to watch a specific PG-13 movie such that the next time the child views the specific PG-13 movie, the action module 206 does not trigger the precautionary action. In such an embodiment, instead of authorizing the child to watch any PG-13 movie, the confirmation decision is only associated with the specific PG-13 movie.

In one embodiment, the confirmation module 302 receives a confirmation decision from an individual who is authorized to provide a confirmation decision, for example, a parent or another authorized individual. In some embodiments, the confirmation module 302 receives a confirmation decision from an input device, such as a remote control, a controller, a smart phone, a tablet computer, a smart watch, or the like. In some embodiments, the confirmation module 302 detects one or more input gestures from the authorized individual that indicate a confirmation decision. For example, an authorized individual may make a waving gesture to confirm that the content should continue playback, i.e., that the unauthorized individual is allowed to view the content.

In one embodiment, the calibration module 304 calibrates the authorization module 204, or the like, such that the authorization module 204 may determine the content authorization parameters of individuals. For example, if an individual comes within a viewing proximity of the content and the authorization module 204 does not recognize the individual using the individual's size, voice, facial features, devices, or the like, the calibration module 304 may collect this information for future reference. In some embodiments, the calibration module 304 associates an individual with the same content authorization parameter of other individuals with similar characteristics, e.g., similar size. For example, the calibration module 304 may assign a content authorization parameter to an individual who has roughly the same height as a child with the content authorization parameter of the child.

In some embodiments, the calibration module 304 prompts an authorized individual to provide input regarding the content authorization for the individual. For example, the action module 206 may suspend playback of a movie in response to an individual that the authorization module 204 does not recognize entering the room, and prompt an authorized individual (e.g., a parent or other adult) to calibrate the authorization module 204 for the individual that was not recognized. This may include determining the individual's size (height and width), facial characteristics, voice, or other physical characteristics. Alternatively, the calibration module 304 may sync a device for the individual, such as smart phone, with the authorization module 204 such that the authorization module 204 receives the individual's content authorization parameter from the device when the device is within a communication proximity. The authorized individual may also manually assign a content authorization parameter to the individual, which the authorization module 204 stored for future reference.

Figure 4:
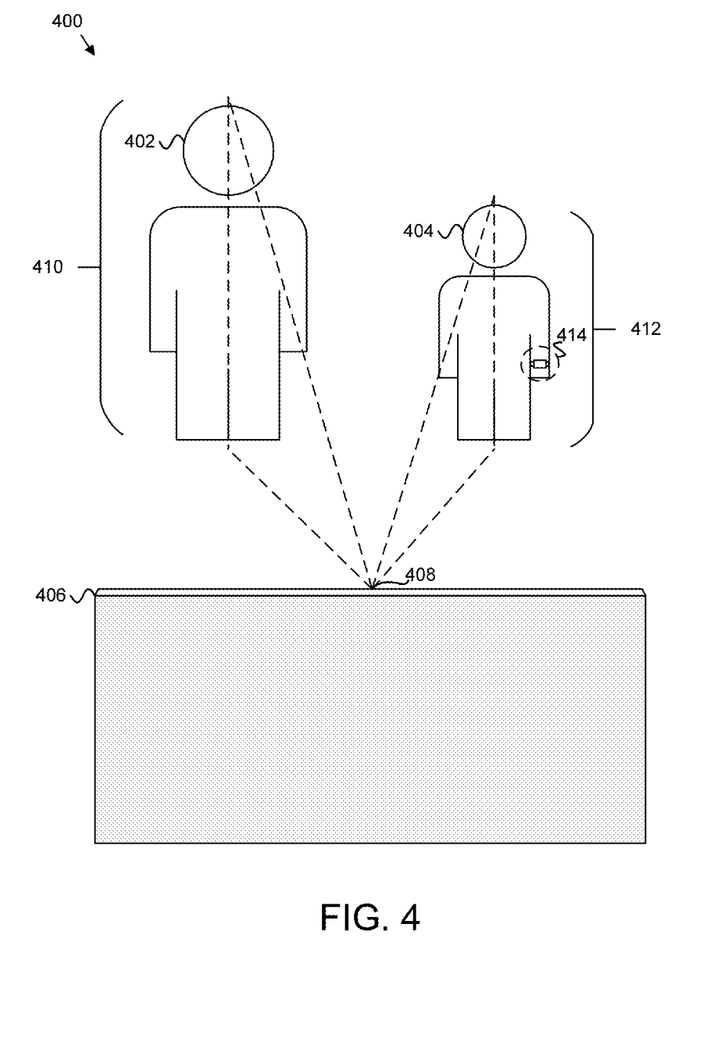
FIG. 4 is a schematic block diagram illustrating one embodiment of a system authorizing content viewing based on content ratings using a sensor.

FIG. 4 depicts one embodiment of a system 400 for authorizing content viewing based on content ratings using a sensor. The depicted embodiment comprises an authorized individual 402, an unauthorized individual 404, and a device 406 configured to present content. The device 406 may include one or more sensors 408 for detecting the presence of an individual, an individual's facial characteristics, or the like. In some embodiments, the device 406 is also in communication with one or more information handling devices associated with an individual, such as a smart watch 414.

In one embodiment, the device 406 comprises a smart television and may present multimedia content, such as a movie or television program, along with accompanying sound. In some embodiments, the authorized individual 402 may be an adult individual 402. The adult individual, for example, may be watching the content in a living room or family room in a home. The adult individual 402 may have an associated content authorization parameter and the authorization module 204 may determine the adult individual's 402 content authorization parameter based on the height 410 (e.g., the size) of the adult individual 402. For example, the authorization module 204, using a sensor 408 for the device 406, such as a camera, may determine the adult individual's height 410 and then reference a list, database, table, or the like, using the adult individual's height 410, to find the adult individual's content authorization parameter. The action module 206 may then determine whether the content authorization parameter of the adult individual 402 is greater than or equal to the content rating of the presented content.

Similarly, the authorization module 204 may determine the height 412 of an unauthorized individual 402, such as a child 404, who may not be authorized to view the presented content, in response to the child 404 entering the room. The authorization module 204 may use the sensor 408, e.g., a camera, to determine the height 412 of the child 404, and then, based on the determined height 412, determine the child's content authorization parameter by referencing a list, table, database, or the like that contains a plurality of individuals' heights and their content authorization parameters.

In some embodiments, the device 406 is in communication with a device associated with an individual, such as a smart watch 414. Other devices may include tablet computers, smart phones, or the like. The smart watch 414 may comprise the content authorization of the individual, such as the child 404, and may send the child's content authorization parameter to the device 406. In certain embodiments, the smart watch 414 communicates with the device 406 via the data network 106. In one embodiment, the data network 106 comprises a wireless data network, such as a Wi-Fi network, a Bluetooth® or Bluetooth® LE network, an NFC network, or the like. For example, the smart watch 414 and the device 406 may be in communication using a Bluetooth® communication protocol. In some embodiments, the authorization module 204 prompts the individual to enter credentials for the device comprising the user's content authorization parameter to verify that they are the authorized user for the device.

In response to determining the child's 404 content authorization parameter, the action module 206 compares the content authorization parameter to the content rating for the presented content. If the action module 206 determines the content authorization parameter for the child 404 is lower than the content rating for the presented content, the action module 206 may trigger a precautionary action. For example, the action module 206 may suspend the presented content (e.g., pause or stop a movie/TV show), blank the screen, mute the sound, change the content to a different content that has a content rating compliant with the child's 404 content authorization parameter.

Figure 5:
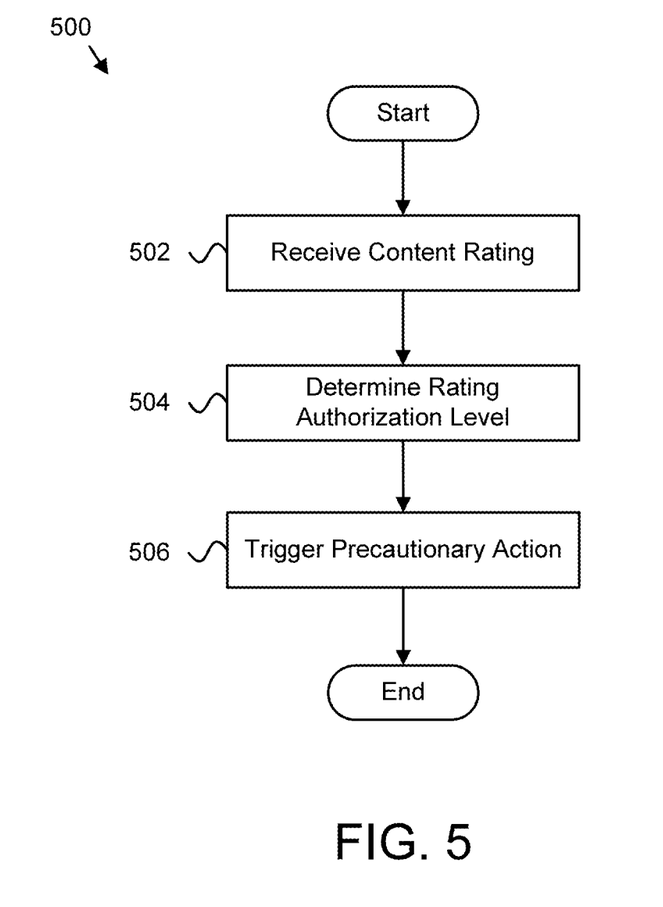
FIG. 5 is a schematic flow chart diagram illustrating one embodiment of a method for authorizing content viewing based on content ratings.

FIG. 5 depicts one embodiment of a method 500 for authorizing content viewing based on content ratings. In one embodiment, the method 500 begins and the rating module 202 receives 502 a content rating for content presented to an individual. For example, a rating associated with a movie, game, television show, or the like. In certain embodiments, the authorization module 204 determines 504 a content authorization parameter for the individual. For example, an adult may be authorized to view rated-R movies while a child may only be authorized to view movies with a PG rating. In a further embodiment, the action module 206 triggers 506 a precautionary action associated with the presented content in response to determining the individual's content authorization parameter is not compliant with the rating of the content, and the method 500 ends.

Figure 6:
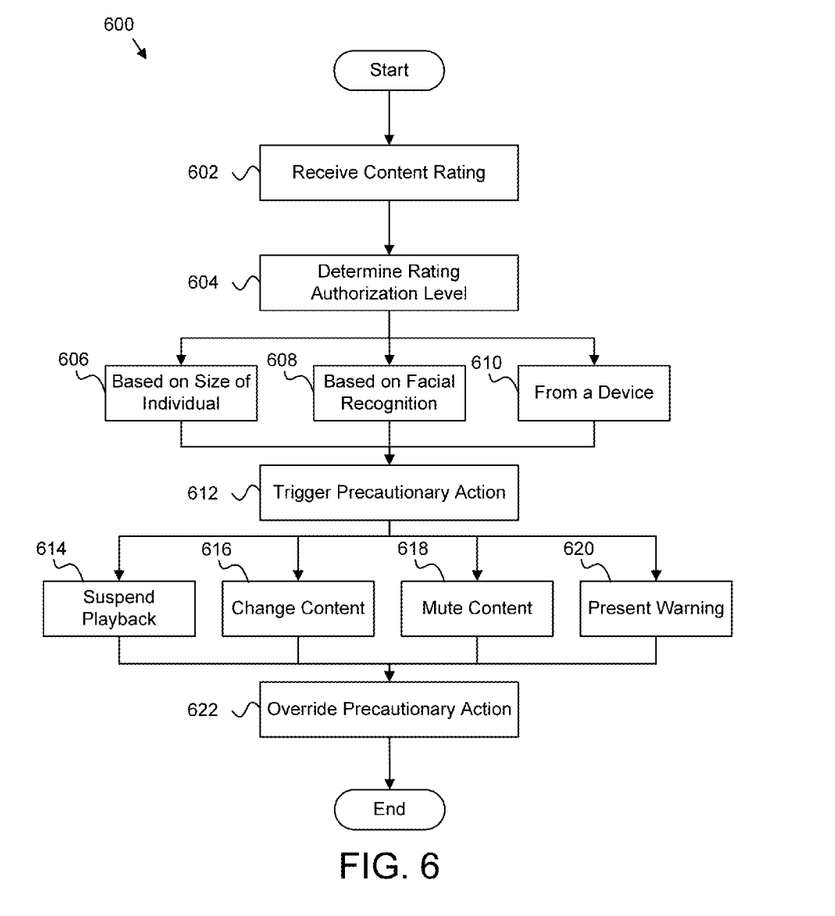
FIG. 6 is a schematic flow chart diagram illustrating one embodiment of another method for authorizing content viewing based on content ratings.

FIG. 6 depicts one embodiment of another method 600 for authorizing content viewing based on content ratings. In one embodiment, the method 600 begins and the rating module 202 receives 602 a content rating for content presented to an individual. In certain embodiments, the authorization module 204 determines 604 a content authorization parameter for the individual. In some embodiments, the authorization module 204 determines 606 the content authorization parameter for the individual based on the individual's height. For example, an adult that is taller than a child may be authorized to view R-rated movies while the child is authorized to view PG-rated movies. Thus, based on the height of the individuals, the authorization module 204 may determine whether an individual is authorized to view the presented content.

In one embodiment, the authorization module 204 determines 608 the content authorization parameter for the individual based on the individual's facial characteristics. For example, the content authorization module 204 may use one or more sensors of a television to perform facial recognition to determine the content authorization parameters of one or more persons in viewing proximity of the content. In a further embodiment, the content authorization module 204 receives 610 the content authorization parameter for an individual from a device associated with the individual, such as a smart watch, tablet computer, laptop computer, smart phone, or the like. In certain embodiments, a device associated with the individual is in communication with the content authorization module 204 via a data network 106, such as a Bluetooth® network, a Wi-Fi network, an NFC network, or the like.

In one embodiment, the action module 206 triggers 612 a precautionary action associated with the presented content in response to determining the individual's content authorization parameter is not compliant with the rating of the content. In some embodiments, the action module 206 suspends 614 playback of the content, such as by pausing or stopping the content. In certain embodiments, the action module 206 changes 616 the content to content that corresponds to the content authorization parameter of the unauthorized person (e.g., changing a rated-R movie to a PG-13 movie). In a further embodiment, the action module 206 mutes 618 the audio of the content.

In one embodiment, the action module 206 presents 620 warnings that an individual in viewing proximity has a content authorization parameter that is lower than the content rating for the presented content. In some embodiments, the confirmation module 302 overrides 622 the precautionary action in response to receiving an override confirmation from an individual. In certain embodiments, the confirmation module 302, in response to the action module 206 triggering a precautionary action, prompts for confirmation from an authorized individual to continue the precautionary action or to override the precautionary action, and the method 600 ends.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method comprising:
   detecting, by a processor, an individual within proximity of a device;
   determining, dynamically, a size of the individual based on input received from one or more sensors associated with the device, the size comprising one or more of a height and a width of the individual;
   receiving a content authorization parameter for the individual from a device associated with the individual, the content authorization parameter stored on the device;
   determining that the individual is an authorized user of the device based on the determined size of the individual;
   receiving a content rating for content presented to the individual on the device;
   verifying that the content authorization parameter for the individual complies with the content rating for the content; and
   triggering a precautionary action associated with the content in response to determining that the content authorization parameter for the individual is not compliant with the content rating for the content, the precautionary action comprising an action that prevents the individual from consuming at least a portion of the content.

2. The method of claim 1, wherein the content authorization parameter for the individual is determined in response to recognizing one or more facial features of the individual.

3. The method of claim 1, wherein the device associated with the individual is selected from the group consisting of a wearable device, a smart phone, and a tablet computer.

4. The method of claim 1, wherein the individual is one of a plurality of individuals comprising a group, the precautionary action being triggered in response to the content authorization parameter for any one individual of the group not being compliant with the content rating for the content.

5. The method of claim 1, wherein the precautionary action comprises suspending playback of the presented content.

6. The method of claim 1, wherein the precautionary action comprises changing the presented content to different content that has a rating compliant with the content authorization parameter of the individual.

7. The method of claim 1, wherein the precautionary action comprises muting the presented content.

8. The method of claim 1, wherein the precautionary action comprises presenting a warning that the individual is not authorized for the content.

9. The method of claim 1, further comprising overriding the precautionary action in response to receiving an override confirmation from an authorized individual, the override confirmation comprising a gesture input.

10. The method of claim 1, further comprising associating a content authorization parameter of a known individual with an unknown individual based on similarities between a size of the known individual and a size of the unknown individual.

11. An apparatus comprising:
a processor;
a sensor that receives input related to an individual;
a memory that stores code executable by the processor, the code comprising:
code that detects an individual within proximity of a device;
code that determines, dynamically, a size of the individual based on input received from one or more sensors associated with the device, the size comprising one or more of a height and a width of the individual;
code that receives a content authorization parameter for the individual from a device associated with the individual, the content authorization parameter stored on the device;
code that determines that the individual is an authorized user of the device based on the determined size of the individual;
code that receives a content rating for content presented to the individual on the device;
code that verifies that the content authorization parameter for the individual complies with the content rating for the content; and
code that triggers a precautionary action associated with the content in response to determining that the content authorization parameter for the individual is not compliant with the content rating for the content, the precautionary action comprising an action that prevents the individual from consuming at least a portion of the content.

12. The apparatus of claim 11, wherein the content authorization parameter for the individual is determined in response to recognizing one or more facial features of the individual using the sensor.

13. The apparatus of claim 11, wherein the precautionary action comprises suspending playback of the presented content.

14. The apparatus of claim 11, wherein the precautionary action comprises changing the presented content to different content that has a rating compliant with the content authorization parameter of the individual.

15. The apparatus of claim 11, further comprising code that overrides the precautionary action in response to receiving an override confirmation from an individual, the override confirmation comprising a gesture input.

16. The apparatus of claim 11, wherein the individual is one of a plurality of individuals comprising a group, the precautionary action being triggered in response to the content authorization parameter for any one individual of the group not being compliant with the content rating for the content.

17. The apparatus of claim 11, wherein the content authorization parameter for the individual is determined in response to receiving the content authorization parameter from a device associated with the individual, the content authorization parameter being located on the device.

18. A program product comprising a non-transitory computer readable storage medium that stores code executable by a processor to perform:
detecting an individual within proximity of a device;
determining, dynamically, a size of the individual based on input received from one or more sensors associated with the device, the size comprising one or more of a height and a width of the individual;
receiving a content authorization parameter for the individual from a device associated with the individual, the content authorization parameter stored on the device;
determining that the individual is an authorized user of the device based on the determined size of the individual;
receiving a content rating for content presented to the individual on the device;
verifying that the content authorization parameter for the individual complies with the content rating for the content; and
triggering a precautionary action associated with the content in response to determining that the content authorization parameter for the individual is not compliant with the content rating for the content, the precautionary action comprising an action that prevents the individual from consuming at least a portion of the content.

* * * * *